United States Patent
Adolphson et al.

(10) Patent No.: US 10,853,441 B1
(45) Date of Patent: Dec. 1, 2020

(54) DYNAMIC EDGE CACHE FOR QUERY-BASED SERVICE

(71) Applicant: BBY SOLUTIONS, INC., Richfield, MN (US)

(72) Inventors: David Adolphson, Apple Valley, MN (US); Sean Godinez, Woodbury, MN (US); Praveen Kotla, Apple Valley, MN (US)

(73) Assignee: BBY SOLUTIONS, INC., Richfield, MN (US)

(*) Notice: Subject to any disclaimer, the term of this patent is extended or adjusted under 35 U.S.C. 154(b) by 0 days.

(21) Appl. No.: 16/792,476

(22) Filed: Feb. 17, 2020

(51) Int. Cl.
*G06F 16/957* (2019.01)
*G06F 16/951* (2019.01)
*G06F 9/54* (2006.01)
*G06F 40/242* (2020.01)
*G06F 16/958* (2019.01)

(52) U.S. Cl.
CPC .......... *G06F 16/9574* (2019.01); *G06F 9/547* (2013.01); *G06F 16/951* (2019.01); *G06F 16/972* (2019.01); *G06F 40/242* (2020.01)

(58) Field of Classification Search
CPC .. G06F 16/9574; G06F 16/972; G06F 16/951; G06F 40/242; G06F 9/547
See application file for complete search history.

(56) References Cited

U.S. PATENT DOCUMENTS

| 7,200,681 B1 | 4/2007 | Lewin et al. |
| 8,886,751 B1* | 11/2014 | Hackett ..................... G06F 7/00 709/217 |
| 9,497,496 B1 | 11/2016 | Corley et al. |
| 2003/0154239 A1 | 8/2003 | Davis et al. |
| 2004/0015538 A1* | 1/2004 | Agarwalla .......... H04L 67/2842 709/203 |
| 2006/0173869 A1* | 8/2006 | Byrne .................. G06F 21/6227 |
| 2009/0019109 A1* | 1/2009 | Bosma ................... G06Q 10/00 709/203 |

(Continued)

OTHER PUBLICATIONS

"API Caching, Part III", © 2020 Fastly, Inc. [online]. [retrieved on May 22, 2020]. Retrieved from the Internet: <URL: https://www.fastly.com/blog/api-caching-part-iii>, (Mar. 5, 2014), 9 pgs.

(Continued)

*Primary Examiner* — Jerry B Dennison
(74) *Attorney, Agent, or Firm* — Schwegman Lundberg & Woessner, P.A.

(57) ABSTRACT

Systems and techniques for dynamic edge cache for query-based services are described herein. A request for web content may be received that includes a fine-grained application programming interface (API) call. Instructions may be generated for at least one coarse-grained API call (e.g., a full dataset) to retrieve data requested by the fine-grained API call (e.g., a data element or subset of the full dataset). A dictionary may be generated to allow the fine-grained API call to retrieve data using the at least one coarse-grained API call. The dictionary and the instructions for the coarse-grained API call may be transmitted to a content delivery server. This technique allows the content delivery server to cache a full dataset via the coarse-grained API call and service fine-grained requests from the edge-cache. This may reduce data transfer and decrease web content delivery times.

24 Claims, 4 Drawing Sheets

(56) References Cited

U.S. PATENT DOCUMENTS

| | | | |
|---|---|---|---|
| 2009/0113461 A1* | 4/2009 | Zhou | G06F 9/449 |
| | | | 719/330 |
| 2014/0033280 A1* | 1/2014 | Nimashakavi | H04L 63/0807 |
| | | | 726/4 |
| 2014/0052811 A1 | 2/2014 | Lewin et al. | |
| 2014/0181187 A1* | 6/2014 | Stevens | H04L 41/0803 |
| | | | 709/203 |
| 2014/0223018 A1 | 8/2014 | Varney et al. | |

OTHER PUBLICATIONS

"Caching and Purging", © 2020 Fastly, Inc. [online]. [retrieved on May 22, 2020]. Retrieved from the Internet: <URL: https://www.fastly.com/products/web-and-mobile-performance/caching-and-purging>, (2020), 6 pgs.

* cited by examiner

DYNAMIC EDGE CACHE FOR QUERY-BASED SERVICE

TECHNICAL FIELD

Embodiments described herein generally relate to caching webpages at an edge server and, in some embodiments, more specifically to dynamic edge caching for query-based application programming interface (API) services.

BACKGROUND

It may be beneficial to serve web pages to users as fast as possible. Having an entire web page (or a large percentage of the web page) served directly to the user from a content delivery network (CDN) may decrease the time it takes to deliver a web page to the user. Additionally, serving directly from the CDN may be less costly, because less traffic traverses the internet to reach backend application servers. While existing approaches may enable serving web site traffic from a CDN, however, these approaches fail to provide efficient caching of dynamically chosen (selected) content, especially when retrieving content with the use of API calls.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

It may be beneficial to serve web pages serve and updates to those web pages (e.g., single-page applications, client-side rendered experiences, etc.) to users as fast as possible. Having a "client side rendered" web page render and re-render as quickly as possible requires that the data for that experience be served directly to the user from the content delivery network (CDN). Additionally, serving application programming interface (API) data directly from the CDN may reduce traffic to application servers. This may increase performance and reduce cost.

Natural traffic patterns of requests to "fine-grained" query-based APIs inherently result in limited opportunity to cache responses to these requests at a CDN because the requests are almost always unique. The uniqueness results from individual users browsing different pages with different pieces of different pages that contribute to query-API requests that include programmatic batching and deduplication. As such, current solutions for caching API requests may be limited to the query-based API service tier. The systems and techniques discussed herein provide a solution to API request caching at the CDN reducing traffic and processing at the API service tier.

Some conventional solutions to the issue of caching API calls may not use fine-grained query-based APIs. However, this approach requires more data to be sent to a user's device making the page slower and more expensive to operationalize. When this larger data block reaches the browser, it takes longer (e.g., more central processing unit (CPU) cycles) to utilize the data within this much larger block.

The systems and techniques discussed herein provide efficient CDN caching of coarse-grained data topics (e.g., APIs) with small and efficient data payloads being sent to the device of a user (e.g., web browsers, native applications, etc.) from the a CDN that supports the industry standard edge-side include (ESI) specification. The benefits are particularly pronounced on mobile devices that may be connected via slow internet connections and may have limited CPU resources.

The systems and techniques discussed herein enable efficient CDN caching of domain service API responses being accessed from a web browser via a dynamic query-based API. Examples of industry standard query-based APIs may include Falcor. JAVASCRIPT@ object notation (JSON) Graph, GraphQL, open data protocol (OData), etc.

Figure 1:
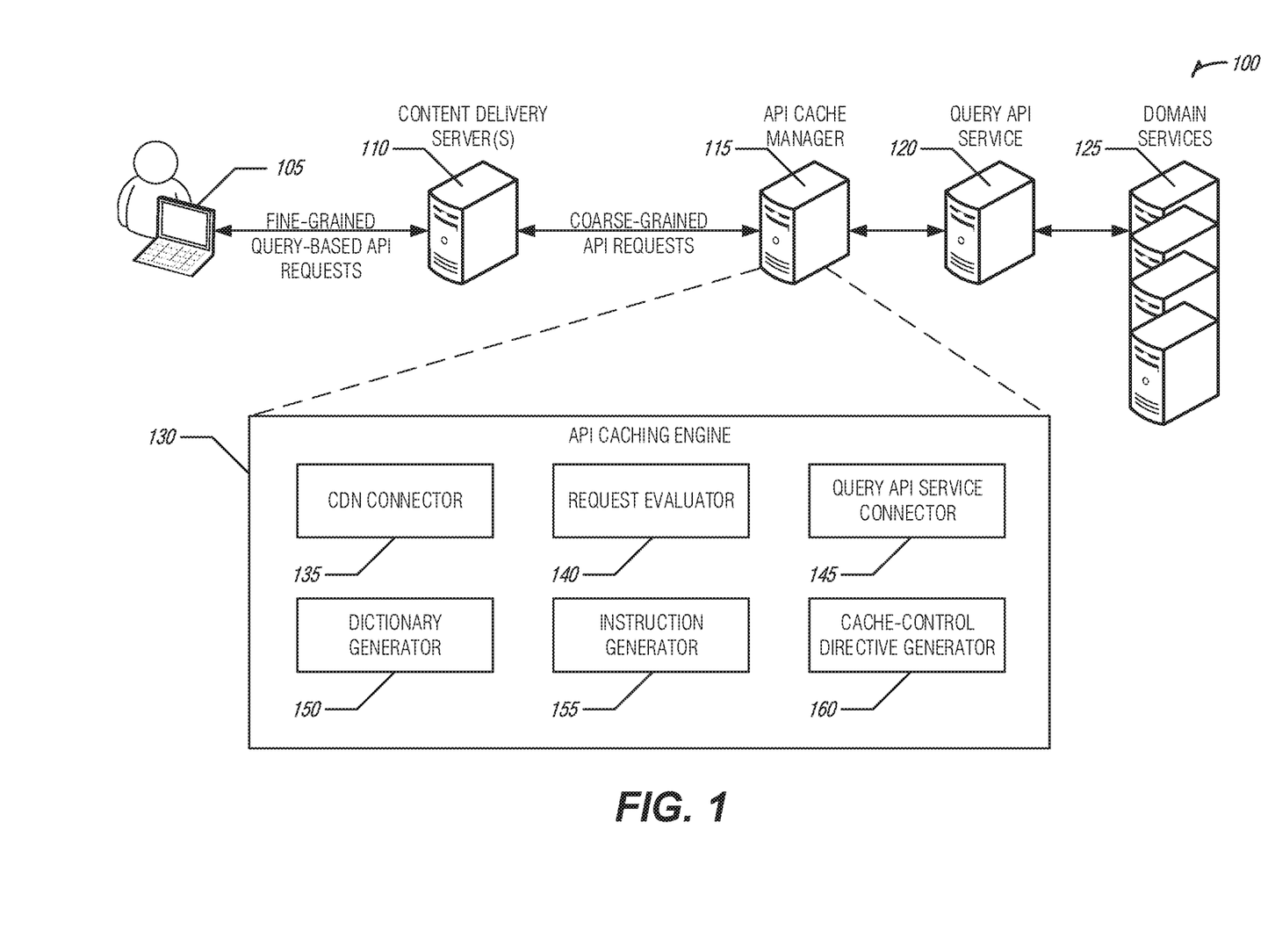
FIG. 1 illustrates a block diagram of an example of an environment and a system for dynamic edge cache for query-based services, according to an embodiment.

FIG. 1 illustrates a block diagram of an example of an environment 100 and a system 130 for dynamic edge cache for query-based services, according to an embodiment. The environment 100 may include a user computing device 105 that transmits a request for a web page to content delivery network (CDN) server(s) 110. The CDN server(s) 110 may be communicatively coupled (e.g., via wired network, wireless network, the internet, cellular network, etc.) to an API cache manager 115. The API cache manager 115 may be communicatively coupled to a query API service 120 that may communicate with a variety of application servers 125 that provide domain services.

The API cache manager 115 may include a system 130. In an example, the system 130 may be an API caching engine. The API cache manager 115 may be a computing device (e.g., a stand-alone computer, a server, a virtual server, a cloud computing platform, etc.). In an example, the API cache manager 115 may be implemented in software stored in computer-readable memory and executed by a computing device, a field programmable gate array (FPGA), an application-specific integrated circuit (ASIC), etc. The system 130 may include a variety of components including a CDN connector 135, a request evaluator 140, a query API service connector 145, a dictionary generator 150, an instruction generator 155, and a cache-control directive generator 160.

The system 130 delivers appropriate instructions (e.g., edge-side include (ESI) instructions, etc.) to the CDN server(s) 110 to allow the CDN server(s) 110 to parse a fine-grained query-based API request (e.g., a small number of fields from any number of domain services, etc.) and translate the fine-grained API call into a set of coarse-grained API requests (e.g., a request for full domain service response for all domain services required to fulfill the fine-grained query-based API request, etc.) that will later be handled by the system 130 in future call-backs (e.g., ESI eval call-backs, etc.). The system 130 creates necessary variables (e.g., ESI variables) within the CDN server(s) 110 to retrieve nested dictionaries (e.g., ESI dictionaries, etc.) out of variables that will be created by the call-backs. The system returns the appropriate query-based API data structure with embedded references to the variables dictionary.

The dictionaries may include variables that may be used to retrieve data requested in fine-grained API calls from data retrieved via a coarse-grained API call. For example, a dictionary may include an identifier for a data element, a corresponding coarse-grained API call, a location for retrieving the data element from the cache, etc. Each callback mentioned is handled and a directive is returned to the CDN server(s) 110 to create a dictionary variable containing the entire coarse-grained domain service response. As used herein, a fine-grained API call is a request for a subset of data that may be included in data retrieved by a coarse-grained API call. The fine-grained API call is more targeted and retrieves fewer data elements than a coarse-grained API call. Fine-grained API calls may reduce data transfer. However, multiple fine-grained API calls may cause more data transfer than one coarse-grained API call that retrieves a larger set of data elements. Thus, caching data retrieved from a coarse-grained API call and allowing the CDN server(s) 110 to retrieve the fine-grained data from the cache using the dictionaries reduces overall data transfer.

The CDN connector 135 may provide connectivity between the CDN server(s) 110 and the API cache manager 115. A request for a web page may be received as the result of a user requesting a web page from the CDN server(s) 110. For example, a user may use an internet browser to request the page by entering http://www.exampleurl.com/shopping into an address bar of the web browser using the user computing device 105. The CDN server(s) 110 may receive the request for the page and transmit data included in the request to the CDN connector 135.

The request evaluator 140 may receive a request from the CDN server(s) 110 a request for web content that include a fine-grained application programming interface (API) call. In an example, the fine-grained API call may be a query-based API call. For example, instead of issuing a coarse-grained call to request/product/<productid> to retrieve all information about a product, a fine-grained call/product/<productid>&attribs=title,imageURL may retrieve only the title and URL for a product image. This prevents transferring and processing of unnecessary data elements.

The query API service connector 145 may provide connectivity between the API cache manager 115 and the query API service 120. The query API service connector 145 may be used to identify coarse-grained API calls that are available to fulfill one or more fine-grained API calls. For example, a request may be transmitted via the query API service connector 145 and a list of valid queries may be returned. Also for example, the response may indicate that a request for the title and URL for the product image may be fulfilled from a coarse-grained API call for the product information. Data retrieved using the query API service connector 145 may be used by the instruction generator 155.

The instruction generator 155 may generate instructions for at least one coarse-grained API call to retrieve data requested by the fine-grained API call. In an example, the instructions for at least one coarse-grained API call may be generated as a set of edge-side include variables. For example, based on the response (or stored API call map, etc.) the instruction generator may generate a coarse-grained API call for the user profile data to retrieve the title and URL for the product image requested in the fine-grained API call.

The dictionary generator 150 may generate a dictionary to allow the fine-grained API call to retrieve data using the at least one coarse-grained API call. For example, the dictionary may include a reference that indicates that requests for fine-grained product information should obtain the title and URL for the product image from the data obtained from a coarse-grained API call for product information.

The dictionary and the instructions for the coarse-grained API call may be transmitted to the CDN server(s) 110 via the CDN connector 135. In an example, an edge-side include directive may be generated by the instruction generator 155 for the fine-grained API call that causes the CDN server(s) 110 to retrieve the dictionary upon receiving a request containing the fine-grained API call. The edge-side include directive may be transmitted to the CDN server(s) 110 as a part of the instructions.

The cache-control directive generator 160 may generate cache-control directives that provide instructions for maintaining and operating the cache accessible by the CDN server(s) 110. In an example, a response to the fine-grained API call may be generated by the instruction generator 155 that includes instructions for retrieving the dictionary. The response may include a cache-control header with an expiration time that may be generated by the cache-control directive generator 160. The expiration time may designate how long the instructions are valid in the cache. The response may be transmitted to the CDN server(s) 110. In an example, a request may be received from the CDN server(s) 110 that includes a uniform resource identifier and a source attribute included in the response. The coarse-grained API call may be executed to retrieve data. A second response may be constructed that includes instructions for storing the data and variables for the dictionary and the second response may be transmitted to the CDN server(s) 110. For example, the request may include an identifier and source for the fine-grained title and URL for the product image and the coarse-grained API call for the product information may be executed and a response that includes instructions for storing the product information or storing instructions for retrieving the product information may be sent to the CDN server(s) 110 for use in conjunction with the dictionary. This allows future fine-grained requests for title and URL for the product image to be completed by the CDN server(s) without execution of the fine-grained API call.

In another example, cache-control directives may be generated by the cache-control directive generator 160 for the CDN server(s) 110 based on a domain service associated with the request and the cache-control directives may be transmitted to the CDN server(s) 110. Each domain may include a variety of available API call that are available for retrieving data (e.g., as determined via the query API service connector 145, etc.). For example, there may be a set of API calls available for user data and a set of API calls available for product data. The API calls may vary from domain service to domain service and the cache-control directives may be generated to accommodate differences between data. For example, user data may change more frequently than product data so the expiration time for a user data API call may be shorter than an expiration time for a product data API call.

Figure 2:
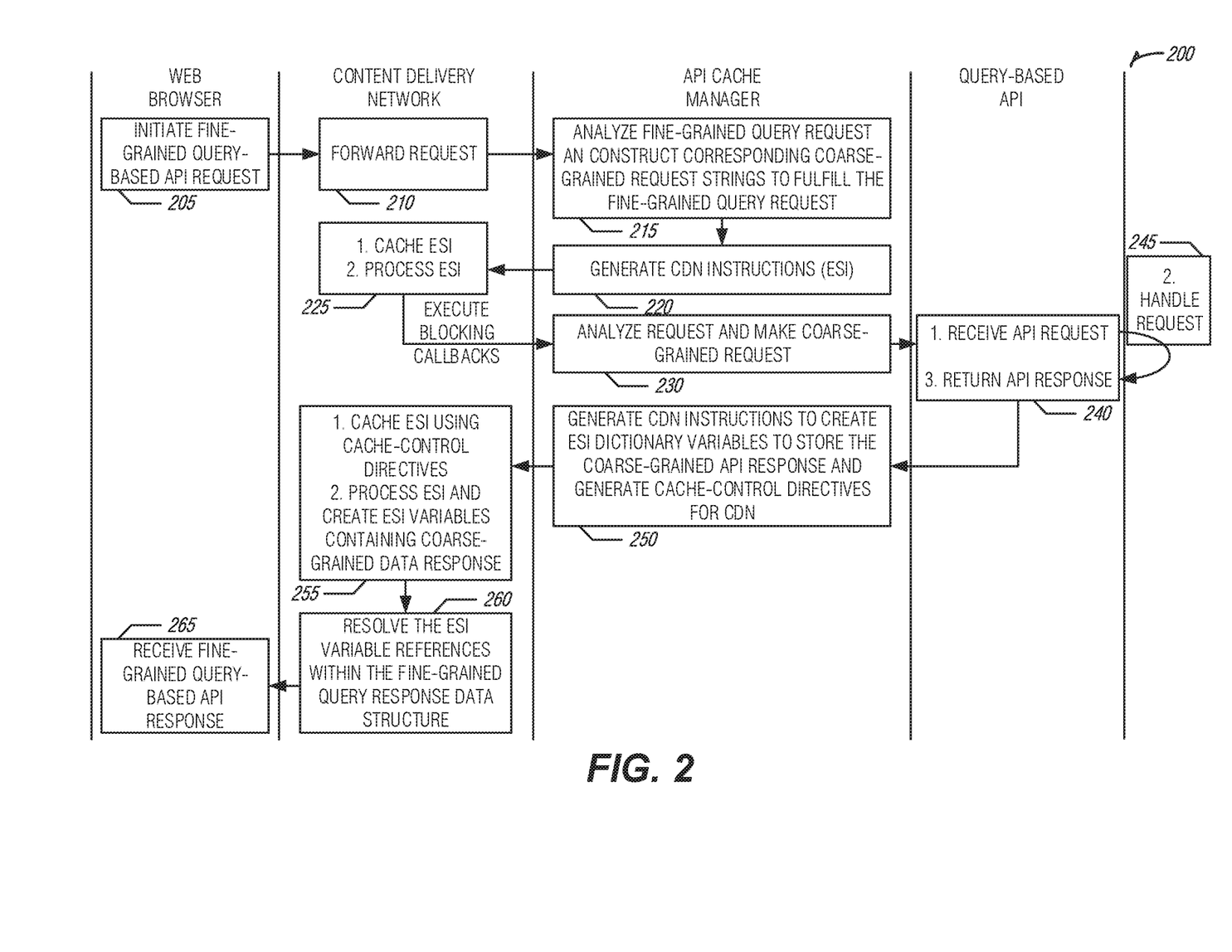
FIG. 2 illustrates a sequence diagram for an example process for dynamic edge cache for query-based services, according to an embodiment.

FIG. 2 illustrates a sequence diagram for an example process 200 for dynamic edge cache for query-based services, according to an embodiment. The process 200 may provide features as discussed in FIG. 1.

The web browser makes a request for a fine-grained query-based API response (e.g., at operation 205). For example, the request could be as shown in Table 1.

TABLE 1

GET /api/tcfb/v1/model.json?paths= [["shop", "calligator". "v1", "warranty", "skus", "5838302", "prices", "100.00", "0", ["currentPrice", "shortName", "term"]]] &method=get The CDN (e.g., CDN server(s) 110 as described in FIG. 1, etc.) forwards the request to the API cache manager (e.g., system 130 as described in FIG. 1, etc.) (e.g., at operation 210). The API cache manager processes this request (e.g., at operation 215) and builds a response (e.g., at operation 220). This response will contain a cache-control header with a "very long" expiration time (60 days or more). For example, the response could be as shown in Table 2.

TABLE 2

```
<esi:eval src="/api-edge/tcfb/model.json?paths= [[ "shop", "calligator", "v1", "warranty", "skus", "5838302", "prices", "100.00"]] &full=true" />
<esi:assign name="A_0" value="$(CALLIGATOR_ V1_WARRANTY_ID_SKU_5838302_PRICES_100_00 { ' 0' } ) " />
<esi:vars>
{
  "jsonGraph" : {
    "shop": {
      "calligator": {
        "v1 ": {
          "warranty": {
            "skus": {
              "5838302 ": {
                "prices": {
                  "100.00": {
                    "0": {
                      "currentPrice":
                        "$type": "atom",
                        $ (A_0{ 'currentPrice' })
                        "$expires": -5000
                    },
                    " term": {
                      "$type": "atom",
                      "$(A_0{ 'term ' })
                      " $expires": -5000
                    },
                    "shortName" : {
                      "$type": "atom",
                      $(A_0{ 'shortName'})
                      "$expires": -5000
                    }
                  }
                }
              }
            }
          }
        }
      }
    }
  }
}
<esi:vars>
```

The CDN processes the previous response (e.g., at operation 225) and generates a request with a uniform resource identifier (URI) in the src attribute of the esi:eval tag for each esi:eval found in the response. In the example in Table 2 there is one esi:eval tag, but there may be multiple esi:eval tags that are processed. In an example, one esi:eval tag may be used that groups multiple esi:include tags to process similar requests as a group.

The requests may be received by the API cache manager (e.g., at operation 230). The API cache manager may construct a request to the underlying query-based API and waits for a response (e.g., at operation 240). When this response is obtained (e.g., upon the query-based API being handled at operation 245), the API cache manager generates a response to the CDN (e.g., at operation 250). The cache-control on the response to the CDN is determined by the underlying domain services or some other means of representing the cache expiration criteria of the coarse-grained data itself. An example of the response could be as shown in Table 3.

TABLE 3

```
<esi:assign name=
"CALLIGATOR_V1_WARRANTY_ID_SKU_5838302_PRICES_
100_00" value="{
  ' 0 ': {
    'skuid': \"value\": \"7861109\", ',
    'term': \"value\": \ "36 months\", ',
    'termLength': {
      'unitOfMeasure': \"value\": \"Years\", ',
      'value': \"value\": \"3\", '
    ),
    'subclass': \"value\": \"111\", '
    'paymentType': \"value\": \"ONETIME\", ',
    'currentPrice': \"value\": 59.99, ',
    'department': \"value\": \"7\", ',
    'shortName': \"value\": \"3-Year Standard Protection\", ',
    'type': \"value\": \"GSP\", '
    'class': \"value\": \"70\", ',
    'protectionType': \"value\": \"Standard\", '
  }
  '1': {
    'skuid': \"value\": \"7861003\", ',
    'term': \ "value\": \"60 months\", ',
    'termLength': {
      'unitOfMeasure': \"value\": \"Years\", ',
      'value': \"value\": \"5\", '
    ),
    'subclass': \"value\": \"111\", ',
    'paymentType': \"value\": \"ONETIME\", ',
    'currentPrice': \"value\": 99.99, ',
    'department': \"value\": \"7\", ',
    'shortName': \"value\": \"5-Year Standard Protection\", ',
    'type': \"value\": \"GSP\", ',
    'class': \"value\": \"70\", ',
    'protectionType': \"value\": \"Standard\", '
  }
  'length': \"value\": 2,'
)"/>
```

The CDN continues and completes processing the ESI directives from the CDN (e.g., at operation 255), resulting in avalid fine-grained query-based API response (e.g., generated at operation 260) being sent to the browser (or other device initiating the original request) (e.g., at operation 265). An example of the response could beas shown in Table 4.

TABLE 4

```
{
  "jsonGraph" : {
    "shop": {
      "calligator": {
        "v1 ": {
          "warranty": {
            "skus": {
              "5838302 ": {
                "prices": {
                  "100.00": {
                    "0": {
                      "currentPrice":
                        "$type": "atom",
                        "value": 59.99,
                        "$expires": -5000
                      },
                      "term": {
                        "$type": "atom",
                        "value": " 36 months",
                        "$expires": -5000
                      },
```

TABLE 4-continued

```
    "shortName" : {
      "$type": "atom",
      "value": "3-Year Standard Protection",
      "$expires": -5000
    }
   }
  }
 }
         }
        }
       }
      }
     }
    }
   }
  }
 }
}
```

Figure 3:
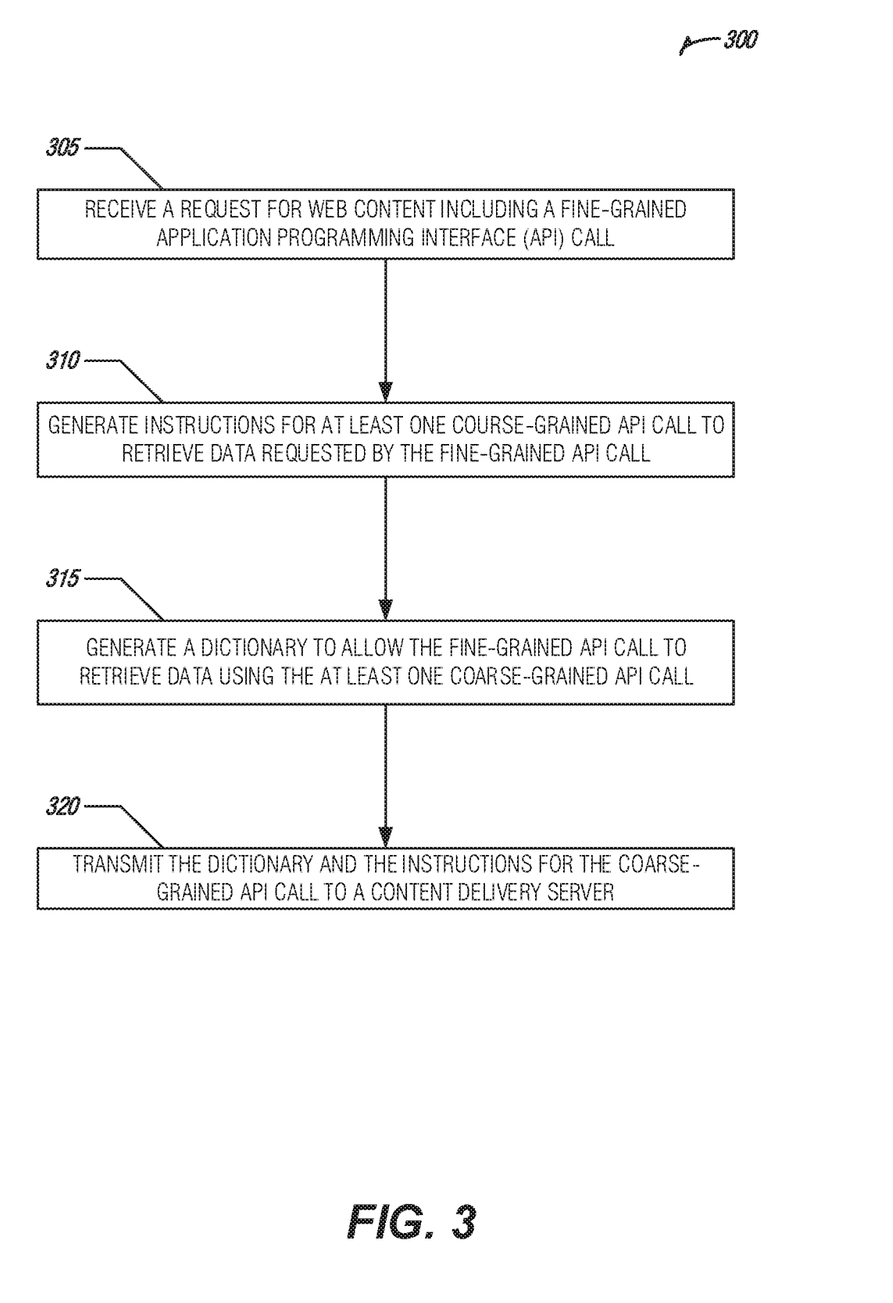
FIG. 3 illustrates an example of a method for dynamic edge cache for query-based services, according to an embodiment.

FIG. 3 illustrates an example of a method 300 for dynamic edge cache for query-based services, according to an embodiment. The method 300 may provide features as discussed in FIGS. 1 and 2.

A request may be received (e.g., by the request evaluator 140 via the CDN connector 135 as described in FIG. 1, etc.) for web content that includes a fine-grained application programming interface (API) call (e.g., at operation 305). In an example, the fine-grained API call may be a query-based API call. Instructions may be generated (e.g., by the instruction generator 155 as described in FIG. 1, etc.) for at least one coarse-grained API call to retrieve data requested by the fine-grained API call (e.g., at operation 310). In an example, the instructions for the at least one coarse-grained API call may be generated as a set of edge-side include variables. A dictionary may be generated (e.g., by the dictionary generator 150 as described in FIG. 1, etc.) to allow the fine-grained API call to retrieve data using the at least one coarse-grained API call (e.g., at operation 315). The dictionary and the instructions for the coarse-grained API call may be transmitted (e.g., via the CDN connector 135 as described in FIG. 1, etc.) to a content delivery server (e.g.at operation 320).

In an example, upon receiving a request containing the fine-grained API call, an edge-side include directive may be generated for the fine-grained API call. The edge-side include directive may be transmitted to the content delivery server. The edge-side include directive may cause the content delivery server to retrieve the dictionary for future requests. In another example, a response to the fine-grained API call may be generated that includes instructions for retrieving the dictionary. The response may include a cache-control header with an expiration time and the response may be transmitted to the content delivery server.

In an example, a request may be received from the content delivery server that includes a uniform resource identifier and a source attribute included in the response. The coarse-grained API call may be executed to retrieve data and a second response may be constructed that includes instructions for storing the data and variables for the dictionary. The response may be transmitted to the content delivery server. In an example, cache-control directives may be generated (e.g., by the cache-control directive generator 160 as described in FIG. 1, etc.) for the content delivery service based on a domain service associated with the request and the cache-control directives may be transmitted to the content delivery server.

Figure 4:
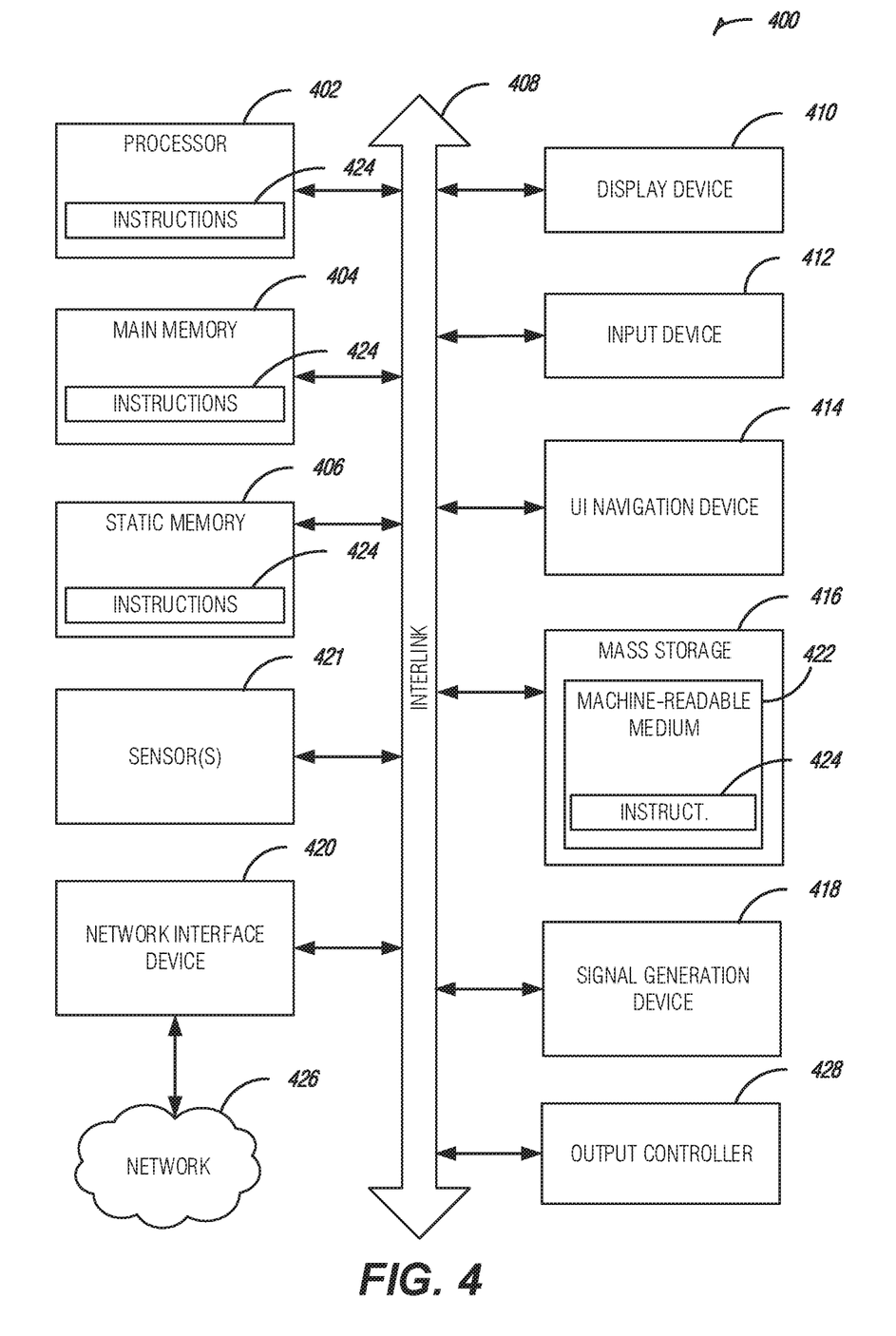
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensors. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi@, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for dynamic caching of query-based services, the system comprising:
at least one processor; and
memory including instructions that, when executed by the at least one processor, cause the at least one processor to perform operations to:
receive a request for web content including a fine-grained application programming interface (API) call;
generate instructions for at least one coarse-grained API call to retrieve data requested by the fine-grained API call;
generate a dictionary to allow the fine-grained API call to retrieve data using the at least one coarse-grained API call; and
transmit the dictionary and the instructions for the coarse-grained API call to a content delivery server.

2. The system of claim 1, wherein the instructions for the at least one coarse-grained API call are generated as a set of edge-side include directives, wherein the coarse-grained API call retrieves a set of data, and wherein the data requested by fine-grained API call is a subset of the set of data.

3. The system of claim 1, the memory further comprising instructions that cause the at least one processor to perform operations to:
generate an edge-side include directive for the fine-grained API call that causes the content delivery server to retrieve the dictionary upon receiving a request that contains the fine-grained API call; and
transmit the edge-side include directive to the content delivery server.

4. The system of claim 1, wherein the fine-grained API call is a query-based API call that requests a subset of data retrieved by the at least one coarse-grained API call.

5. The system of claim 1, the memory further comprising instructions that cause the at least one processor to perform operations to:
generate a response to the fine-grained API call that includes content delivery server instructions to retrieve the dictionary, wherein the response includes a cache-control header with an expiration time; and
transmit the response to the content delivery server.

6. The system of claim 5, the memory further comprising instructions that cause the at least one processor to perform operations to:
receive a request from the content delivery server that includes a uniform resource identifier and a source attribute included in the response;
execute the coarse-grained API call to retrieve data;
construct a second response that includes content delivery server instructions to store the data and variables for the dictionary; and
transmit the second response to the content delivery server.

7. The system of claim 6, the memory further comprising instructions that cause the at least one processor to perform operations to:
generate cache-control directives for the content delivery server based on a domain service associated with the request; and
transmit the cache-control directives to the content delivery server.

8. The system of claim 1, wherein the dictionary includes fields that map data elements from the fine-grained API call to data elements retrieved from the at least one coarse-grained API call.

9. At least one non-transitory machine-readable medium including instructions for dynamic caching of query-based services that, when executed by at least one processor, cause the at least one processor to perform operations to:
receive a request for web content including a fine-grained application programming interface (API) call;
generate content delivery server instructions for at least one coarse-grained API call to retrieve data requested by the fine-grained API call;
generate a dictionary to allow the fine-grained API call to retrieve data using the at least one coarse-grained API call; and
transmit the dictionary and the content delivery server instructions for the coarse-grained API call to a content delivery server.

10. The at least one non-transitory machine-readable medium of claim 9, wherein the content delivery server instructions for the at least one coarse-grained API call are generated as a set of edge-side include directives, wherein the coarse-grained API call retrieves a set of data, and wherein the data requested by fine-grained API call is a subset of the set of data.

11. The at least one non-transitory machine-readable medium of claim 9, further comprising instructions that cause the at least one processor to perform operations to:
generate an edge-side include directive for the fine-grained API call that causes the content delivery server to retrieve the dictionary upon receiving a request that contains the fine-grained API call; and
transmit the edge-side include directive to the content delivery server.

12. The at least one non-transitory machine-readable medium of claim 9, wherein the fine-grained API call is a query-based API call that requests a subset of data retrieved by the at least one coarse-grained API call.

13. The at least one non-transitory machine-readable medium of claim 9, further comprising instructions that cause the at least one processor to perform operations to:
generate a response to the fine-grained API call that includes content delivery server instructions to retrieve the dictionary, wherein the response includes a cache-control header with an expiration time; and
transmit the response to the content delivery server.

14. The at least one non-transitory machine-readable medium of claim 13, further comprising instructions that cause the at least one processor to perform operations to:
receive a request from the content delivery server that includes a uniform resource identifier and a source attribute included in the response;
execute the coarse-grained API call to retrieve data;
construct a second response that includes content delivery server instructions to store the data and variables for the dictionary; and
transmit the second response to the content delivery server.

15. The at least one non-transitory machine-readable medium of claim 14, further comprising instructions that cause the at least one processor to perform operations to:
generate cache-control directives for the content delivery server based on a domain service associated with the request; and
transmit the cache-control directives to the content delivery server.

16. The at least one non-transitory machine-readable medium of claim 9, wherein the dictionary includes fields that map data elements from the fine-grained API call to data elements retrieved from the at least one coarse-grained API call.

17. A method for dynamic caching of query-based services, the method comprising:
   receiving a request for web content including a fine-grained application programming interface (API) call;
   generating instructions for at least one coarse-grained API call to retrieve data requested by the fine-grained API call;
   generating a dictionary to allow the fine-grained API call to retrieve data using the at least one coarse-grained API call; and
   transmitting the dictionary and the instructions for the coarse-grained API call to a content delivery server.

18. The method of claim 17, wherein the instructions for the at least one coarse-grained API call are generated as a set of edge-side include directives, wherein the coarse-grained API call retrieves a set of data, and wherein the data requested by fine-grained API call is a subset of the set of data.

19. The method of claim 17, further comprising:
   generating an edge-side include directive for the fine-grained API call that causes the content delivery server to retrieve the dictionary upon receiving a request containing the fine-grained API call; and
   transmitting the edge-side include directive to the content delivery server.

20. The method of claim 17, wherein the fine-grained API call is a query-based API call that requests a subset of data retrieved by the at least one coarse-grained API call.

21. The method of claim 17, further comprising:
   generating a response to the fine-grained API call including content delivery server instructions for retrieving the dictionary, wherein the response includes a cache-control header with an expiration time; and
   transmitting the response to the content delivery server.

22. The method of claim 21, further comprising:
   receiving a request from the content delivery server including a uniform resource identifier and a source attribute included in the response;
   executing the coarse-grained API call to retrieve data;
   constructing a second response including content delivery server instructions for storing the data and variables for the dictionary; and
   transmitting the second response to the content delivery server.

23. The method of claim 22, further comprising:
   generating cache-control directives for the content delivery server based on a domain service associated with the request; and
   transmitting the cache-control directives to the content delivery server.

24. The method of claim 17, wherein the dictionary includes fields that map data elements from the fine-grained API call to data elements retrieved from the at least one coarse-grained API call.

* * * * *